Jan. 4, 1938. M. M. CAMPBELL 2,104,450
CASING CONVEYER
Filed Nov. 30, 1934 5 Sheets-Sheet 1
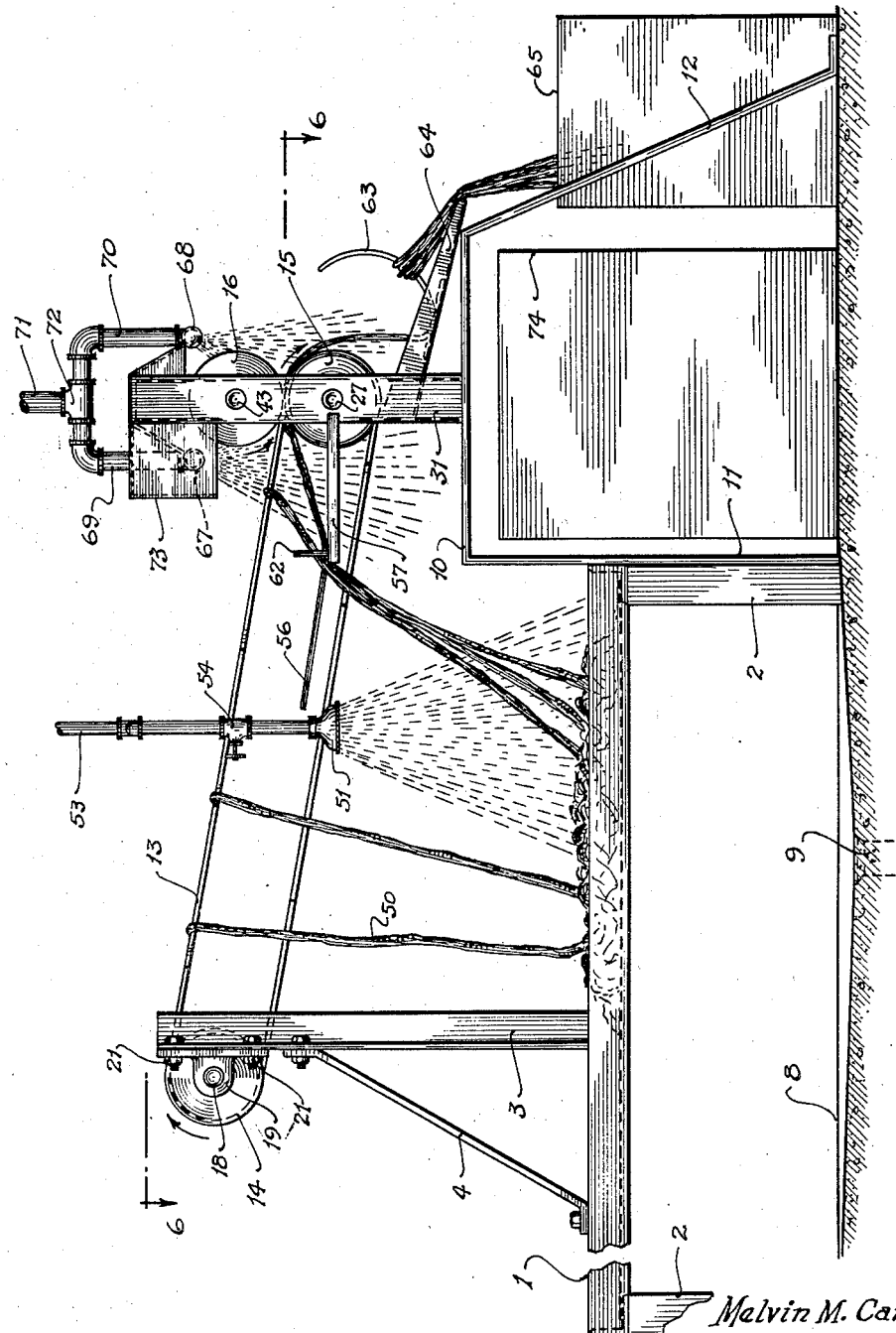
Fig.1
Melvin M. Campbell
INVENTOR
Witness-
BY 
ATTORNEY Jan. 4, 1938.         M. M. CAMPBELL         2,104,450
               CASING CONVEYER
           Filed Nov. 30, 1934      5 Sheets-Sheet 3

Melvin M. Campbell
INVENTOR

BY
    ATTORNEY witness-

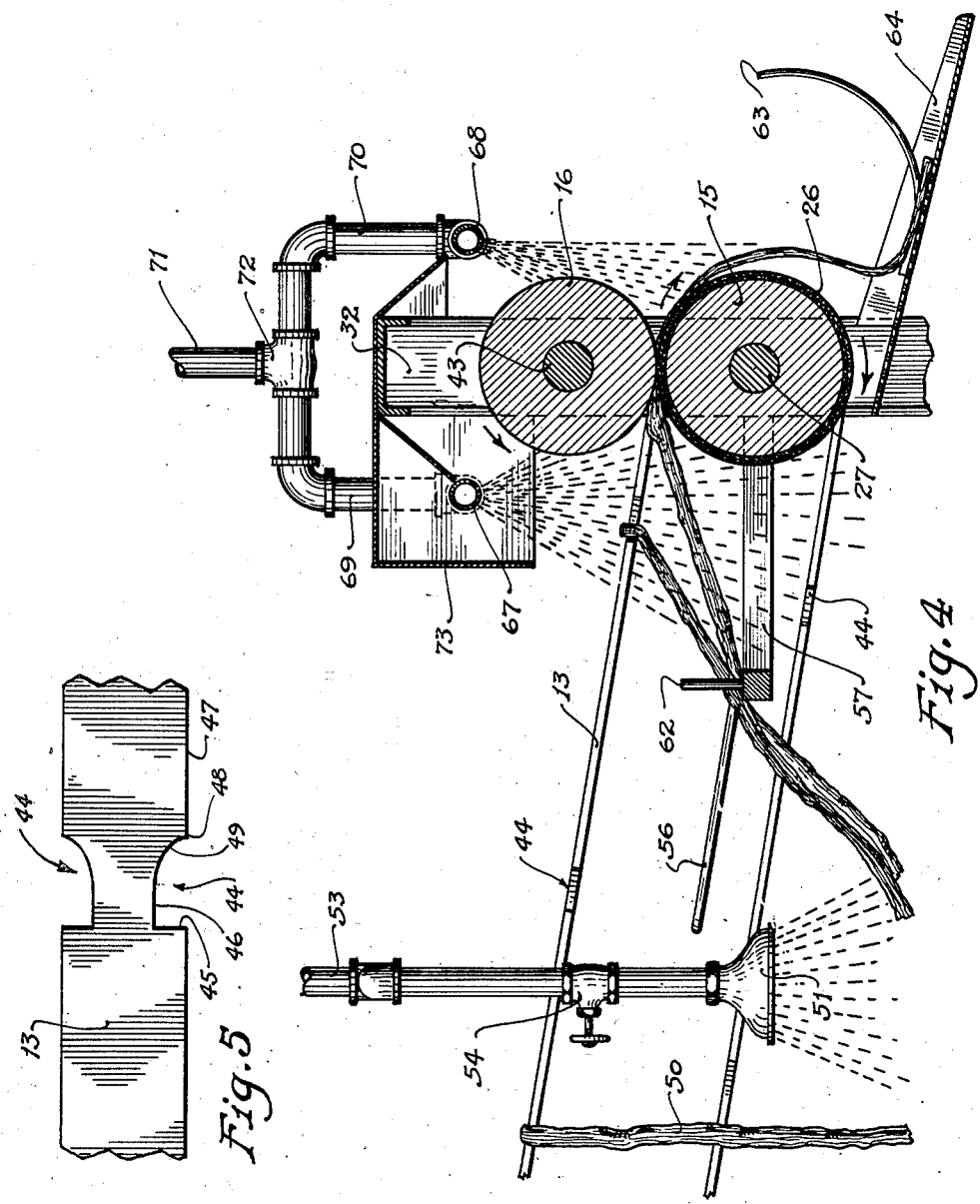

Patented Jan. 4, 1938

2,104,450

UNITED STATES PATENT OFFICE 2,104,450

CASING CONVEYER

Melvin M. Campbell, South St. Joseph, Mo., assignor to Industrial Patents Corporation, Chicago, Ill., a corporation of Delaware Application November 30, 1934, Serial No. 755,437

14 Claims. (Cl. 17—43)

This invention relates to an improved casing cleaning device.

One of the objects of the invention is to provide a casing treating device which may be operated with a minimum of labor, and which is exceptionally efficient in cleaning casings.

Another object of the invention is to provide a casing treating machin in which unitary lengths of casings may be individually cleaned whereby each casing is more thoroughly cleaned than would be the case if a plurality of lengths of casings were cleaned together.

Another object of the invention is to provide a casing cleaning machine in which individual lengths of casings may be individually observed and inspected as they successively pass through the machine.

Another object of the invention is to provide a casing cleaning machine adapted to individually clean lengths of casings and to gather a plurality of such individually cleaned lengths of casings in aggroupment whereby the group of casings may be removed from the device for further operations either singly or as a group or may be tied together in a conventional hank.

Another object of the invention is to provide an improved conveying means whereby individual lengths of casings, or groups of casings if desired, may be conveyed through appropriate cleaning devices in such a manner as to minimize damage to the casings and in such a manner as to efficiently clean the casings.

Another object of the invention is to provide novel means for securing casings to a conveyer whereby casings may be carried between fatting, stripping or cleaning rollers without provision for clearance between the rollers to accommodate such securing means.

Other objects of the invention will be apparent from the description and claims which follow.

The first step in preparing sausage casings from animal intestines is the removal of manure and food from the interior of the casings. This is performed by passing the casings through one or more pairs of rollers in what is known as a stripping machine or, if desired, this operation is performed by hand. The subsequent treatment of the casings is designed to break down and remove slime and tissues, which is done by passing the casings through pairs of rollers in what are known as cleaning machines.

For purposes of illustration but not by way of limitation I will describe a preferred embodiment of my invention as it may be employed in the stripping or cleaning of beef small intestines and hog small intestines. In the conventional method of handling these items, the casings are hung by their centers on a peg or hook. An operator then loops a rope around four or five casings passes the group of casings between the stripping rollers, cleaning rollers or revolving brushes of a stripping or cleaning machine by hooking the rope over a reel which pulls the casings between the brushes.

The device of the present invention eliminates the labor required to group the casings in the conventional practice which has been described.

For a full understanding of the several aspects of my invention reference may be had to the drawings which accompany this specification in which similar reference characters in the several figures indicate similar elements.

Figure 1 is a side view of a preferred embodiment of my invention as employed in a casing stripping machine.

Figure 4 is a view partly in section on line 4—4 of Figure 2.

Figure 5 is a detail of a portion of the novel conveyer belt employed in my invention showing the means for holding casings thereon.

Figure 2:
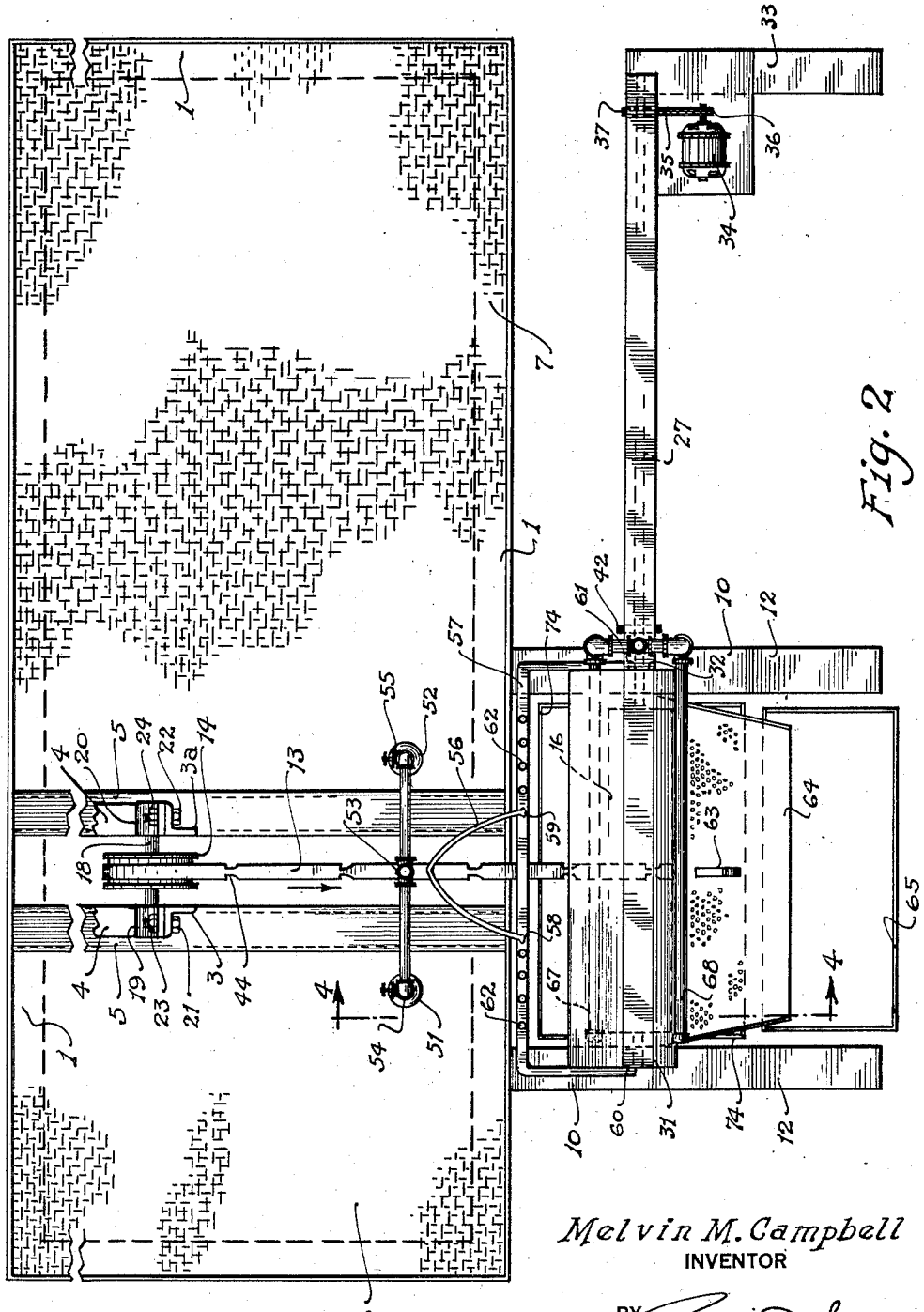
Figure 2 is a plan view of the device shown in Figure 1.
Figure 3:
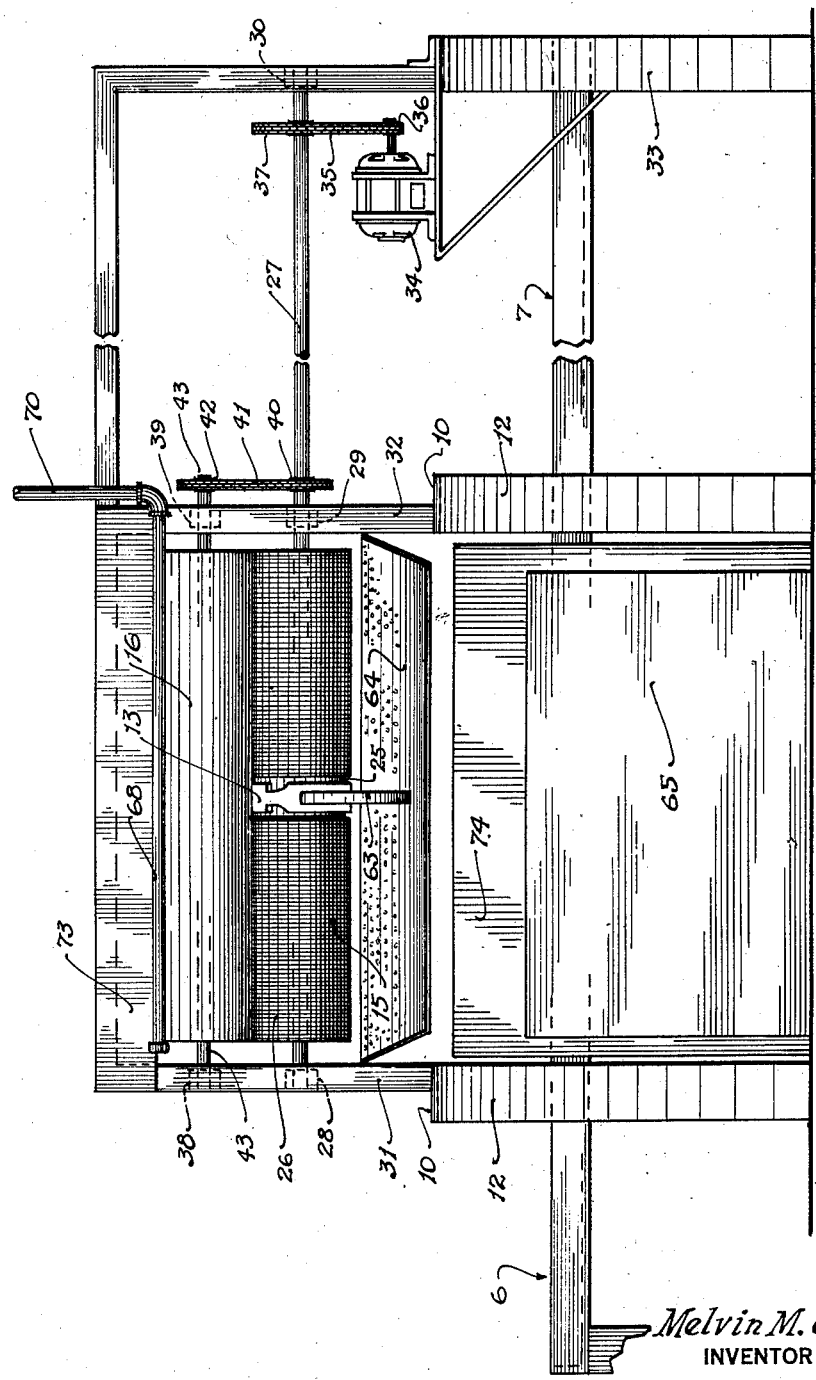
Figure 3 is an elevation of the discharge end of the machine shown in Figure 1.
Figure 6:
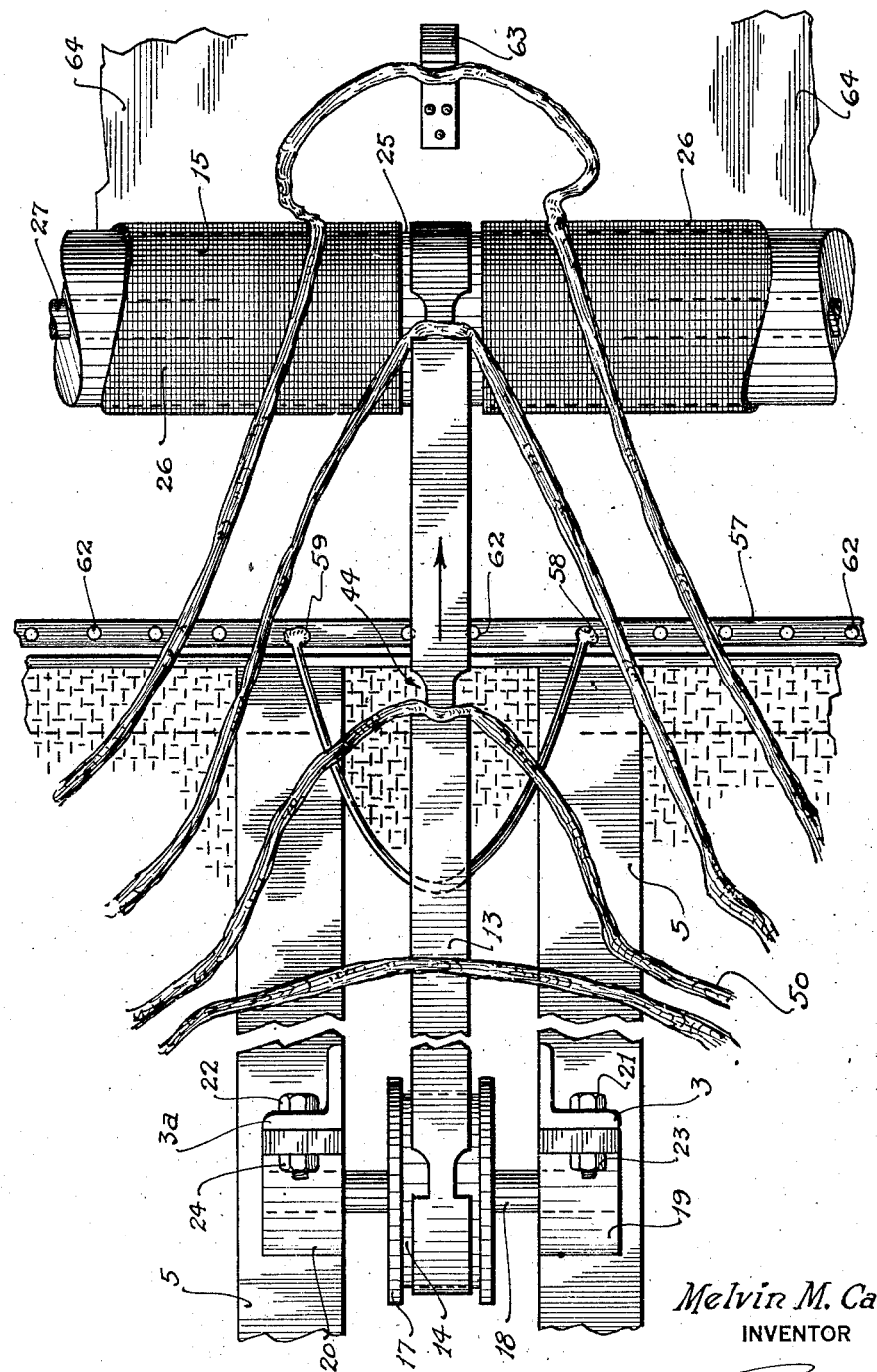
Figure 6 is a plan view showing the central portion of the device in detail on line 6—6 of Figure 1.

Referring now to Figure 1, the casing stripping machine shown in this figure is mounted upon a suitable angle iron framework 1 supported by legs 2. One end of the stripping machine is mounted upon uprights 3 and 3a supported by braces 4, uprights 3 and 3a and braces 4 being rigidly affixed to the frame 1 on cross pieces 5.

It will be seen by reference to Figure 2 that frame 1 carries two screens 6 and 7. In practice I have constructed these screens of three-quarters-inch-square mesh, three-sixteenths-inch-diameter galvanized wire. Wire screens 6 and 7 serve as convenient storage racks for casings and prevent casings being cleaned from falling to the floor 8. Water and other drainage from the casings passes through wire screens 6 and 7 to sewer inlet or drain 9. The discharge end of the machine is mounted upon standard 10 supported by legs 11 and braces 12.

Conveyer belt 13 is mounted on loose pulley 14 and roller 15 and is adapted to carry casings between rollers 15 and 16. It will be seen by reference to Figure 1 that the conveyer belt 13 is positioned at an angle such that the upper or working flight moves downwardly toward the rollers 15 and 16.

Pulley 14 is provided with flanges 17 and is mounted on shaft 18 journalled in bushings 19 and 20 which are rigidly affixed to standards 3 and 3a by bolts 21 and 22 secured by nuts 23 and 24. Belt 13 is mounted on roller 15 in peripheral recess 25. Roller 15 which is shown as covered with burlap 26 is mounted on shaft 27 journalled in bushings 28, 29 and 30. Bushing 28 is mounted in riser 31 mounted upon standard 10. Bushing 29 is mounted in riser 32 also mounted upon standard 10. Bushing 30 is mounted in frame 33 upon which is mounted motor 34 driving shaft 27 through chain 35 geared to the motor at 36 and to the shaft 27 at 37. In practice I have used a six-inch wooden roll covered with three-ply burlap covering for roller 15, the driving mechanism being geared to turn roller 15, 20 revolutions per minute. Roller 16 is preferably an uncovered wood roller and is mounted on shaft 43 journalled in bushings 38 and 39 mounted on risers 31 and 32 respectively. Roller 16 is driven by power transmitted from shaft 27 through sprocket 40 mounted on shaft 27, chain 41 and sprocket 42 mounted on shaft 43.

Belt 13 is provided with a plurality of opposed similar notches 44 arranged in pairs. Notches 44 may be of any suitable design but, as shown in Figure 5, in a device adapted for use with beef small intestines and hog small intestines, notches 44 are cut inwardly at right angles a distance of one half inch to provide the squared edge 45 and then cut longitudinally of the belt a distance of three quarters inch to form straight edge 46 at right angle to edge 45, then flared outwardly to the outer edge 47 of the belt, meeting edge 47 at 48. Corner 48 is three quarters inch from an imaginary perpendicular dropped to edge 46 three quarters inch from edge 45. It will be seen therefore that there is formed a concave edge 49 and that notch 44 is one and one-half inches at its greatest length and one half inch at its greatest depth. The belt as shown is two inches wide. Each pair of notches cooperates to form a means for securing casings to the belt and are spaced twelve inches apart the entire length of the belt, which with notches of the size just described, is preferably two inches wide and prepared from four-ply canvass and of white rubber. It will be understood of course, that wide variations in size and design of the notches are within the broad purview of the present invention.

In operation, the belt 13 travels in the direction of the arrows as shown in Figure 2. An operator throws a length of casing over the upper flight of conveyer 13 so that an individual casing 50 is draped over the conveyer belt 13 at approximately the middle of the casing. As belt 13 moves, the casing 50 is caught in the pair of notches 44 and pulled along by edges 45. The lower portions of the casings are subjected to a spray of water emitted through sprays 51 and 52 mounted on pipe 53 which is supplied with water coming from a source not shown. Sprays 51 and 52 are controlled respectively by valves 54 and 55. Water from sprays 51 and 52 serves also to wash material squeezed from the casings by the action of the rollers 15 and 16 through screens 6 and 7 to drain 9. The ends of the casings are spread apart and thus separated from each other by arched separator 56 which is welded to rod 57 at 58 and 59. Rod 57 is affixed to risers 31 and 32 at 60 and 61 and remains stationary and rigid. A plurality of pins 62 are affixed to and rise upwardly from rod 57. As a casing is drawn between the rollers, an operator adjusts each side of the casing so that but one strip of casing is at any one time passing between any two pins, thus distributing the casings over the available area of the contacting rollers 15 and 16 to avoid bunching and the consequent reduction in efficiency of the rollers and possible damage to the casings which results from the conventional method of feeding casings to a stripping or cleaning machine in bunches.

After the casings have passed through the rollers, they fall from the conveyer belt 13 which passes around roller 15 and are caught on divider 63, the loose ends falling down along perforated slide 64 with the ends hanging in receptacle 65.

Any number of casings may be collected on divider 63 and may be tied together in a hank which is dropped in a container 65. Where desired, a cleaning machine may be mounted immediately following the stripping machine in such a manner that instead of falling on divider 63 the casings fall by their centers on another notched conveyer belt like 13 to be drawn through the rollers of a cleaning machine. It will be understood that this sequence may be repeated as often as desired to carry the casings through a plurality of machines. It will also be understood that other sets of rollers may be provided in a single machine whereby a single notched conveyer belt will carry the casings through a plurality of sets of rollers, it being necessary only that one of the rollers of each pair, preferably the lower roller, be provided with a peripheral recess to accommodate the belt.

The preferred embodiment of my invention disclosed in the drawings is provided with conventional means for wetting the casings as they are drawn through the rollers, comprising perforated pipes 67 and 68 supplied with water through pipes 69 and 70 respectively connected to line 71 by T 72. Line 71 is supplied with water from a source not shown. A guard 73 serves to avoid splashing of water from pipe 67. The wash water from pipes 67 and 68 drains downwardly into tank 74 from whence it passes to a drain, not shown.

As has been previously pointed out, the present invention may be used with any type of casing and with any type of casing treating machine which it is desired to use, whether the machine be designed to strip, fat or clean the casings. It will be further understood that the notched belt herein disclosed may be utilized for the conveyance, singly or in groups, not only of animal intestines, but of artificial casings and of any other elongated flexible substance. For example, if it is desired to treat cellulose casings with glycerine to avoid cracking as is common in that art, individual lengths of cellulose casings which have been soaked in glycerine may be conveyed through squeezing rollers by means of the notched belt of the present invention in order to remove excess glycerine. Furthermore if it is desired to space elongated flexible items on a belt for drying, heating, spraying, or other treatment, the items may be thrown over the notched belt of the present invention at random and the moving belt will cause the item to be caught at the notches, thus spacing the items from each other.

It will be seen furthermore, that this conveying means, if submerged, may be utilized to subject casings to the action of brine, antiseptics, or other solutions, or to subject any elongated flexible item to the action of any solution, such as a dye or the like.

It will be understood that changes may be made in the design of the several features of my invention as hereinbefore disclosed without departing from the spirit of the invention as disclosed in the claims which follow:

I claim:

1. A casing treating machine comprising a frame, a pulley mounted on said frame, a standard, squeezing rollers mounted on said standard, a peripheral recess in one of said squeezing rollers, and an endless conveyer belt mounted on said pulley and on said recessed roller in said recess.

2. A casing treating machine comprising a frame, a pulley mounted on said frame, a standard, squeezing rollers mounted on said standard, a peripheral recess in one of said squeezing rollers, and an endless conveyer belt mounted on said pulley and on said recessed roller in said recess, said conveyer belt being provided with notches in the sides adapted to securely hold casings for conveyance through said rollers.

3. A casing treating machine comprising a frame, a pulley mounted on said frame, a standard, squeezing rollers mounted on said standard, a peripheral recess in one of said squeezing rollers, and an endless conveyer belt mounted on said pulley and on said recessed roller in said recess, said conveyer belt being provided with means for positively holding said casings for conveyance between said rollers.

4. In a casing treating machine, a pair of squeezing rollers, a peripheral recess in one of said rollers, and an endless conveyer belt provided with means for positively pulling casings between said rollers, said conveyer belt being mounted in said recess and adapted to run therein.

5. In a casing treating machine including a pair of squeezing rollers, a relatively narrow peripheral recess in one of said rollers, and a conveyer belt mounted on said recessed roller, in said recess.

6. A casing treating machine comprising a frame, a pulley mounted on said frame, a standard, squeezing rollers mounted on said standard, a peripheral recess in one of said squeezing rollers, an endless conveyer belt mounted on said pulley and on said recessed roller in said recess, said conveyer belt being provided with notches in the sides adapted to securely hold casings for conveyance through said rollers, and a separator mounted at the entrance side of said rollers to separate strands of casing suspended from either side of said belt.

7. A casing treating machine comprising a frame, a pulley mounted on said frame, a standard, squeezing rollers mounted on said standard, a peripheral recess in one of said squeezing rollers, an endless conveyer belt mounted on said pulley and on said recessed roller in said recess, said conveyer belt being provided with notches in the sides adapted to securely hold casings for conveyance through said rollers, a separator mounted at the entrance side of said rollers to separate strands of casing suspended from either side of said belt, and a plurality of spaced pins adapted to separate the strands of a plurality of casings simultaneously passing through the rollers.

8. A casing treating machine comprising a frame, a pulley mounted on said frame, a standard, squeezing rollers mounted on said standard, a peripheral recess in one of said squeezing rollers, an endless conveyer belt mounted on said pulley and on said recessed roller in said recess, said conveyer belt being provided with notches in the sides adapted to securely hold casings for conveyance through said rollers, a separator mounted at the entrance side of said rollers to separate strands of casing suspended from either side of said belt, a plurality of spaced pins adapted to separate the strands of a plurality of casings simultaneously passing through the rollers, and a divider positioned at the discharge side of the rollers opposite the said recess to receive casings upon discharge from the rollers.

9. A casing treating machine comprising a frame, a pulley mounted on said frame, a standard, squeezing rollers mounted on said standard, a peripheral recess in one of said squeezing rollers, an endless conveyer belt mounted on said pulley and on said recessed roller in said recess, said conveyer belt being provided with notches in the sides adapted to securely hold casings for conveyance through said rollers, a separator mounted at the entrance side of said rollers to separate strands of casing suspended from either side of said belt, a plurality of spaced pins adapted to separate the strands of a plurality of casings simultaneously passing through the rollers, and a divider positioned at the discharge side of the rollers in a position to receive casings discharged from said rollers.

10. A casing treating machine comprising a frame, a pulley mounted on said frame, a standard, squeezing rollers mounted on said standard, a peripheral recess in one of said squeezing rollers, an endless conveyer belt mounted on said pulley and on said recessed roller in said recess, said conveyer belt being provided with notches in the sides adapted to securely hold casings for conveyance through said rollers, a separator mounted at the entrance side of said rollers to separate strands of casing suspended from either side of said belt, a plurality of spaced pins adapted to separate the strands of a plurality of casings simultaneously passing through the rollers, and means for receiving in suspension, casings discharged from the rollers.

11. In a casing treating machine including a pair of squeezing rollers and an endless conveyer belt passing between said rollers, means positioned at the entrance side of said rollers to separate the two ends of strands of casings delivered to said rollers by said belt.

12. In a casing treating machine including a pair of squeezing rollers and an endless conveyer belt passing between said rollers, means positioned at the entrance side of said rollers to separate strands of casings delivered to said rollers by said belt, and a plurality of spaced pins mounted between said separating means and said rollers.

13. In a casing treating machine including a pair of squeezing rollers and an endless conveyer belt passing between said rollers, means separating the two ends and independent means for spacing the separated ends of a plurality of casings simultaneously passing between said squeezing rollers.

14. A casing treating machine comprising a pulley, a pair of cleaning rollers, an endless belt mounted on said pulley and one of said rollers, a peripheral recess in one of said cleaning rollers to accommodate said belt, said belt being provided with notches at spaced points, means for driving said rollers, means for spraying water on said rollers, means for separating the two ends of strands of casings passing through said rollers, and means for receiving casings discharged from said rollers.

MELVIN M. CAMPBELL.